UNITED STATES PATENT OFFICE.

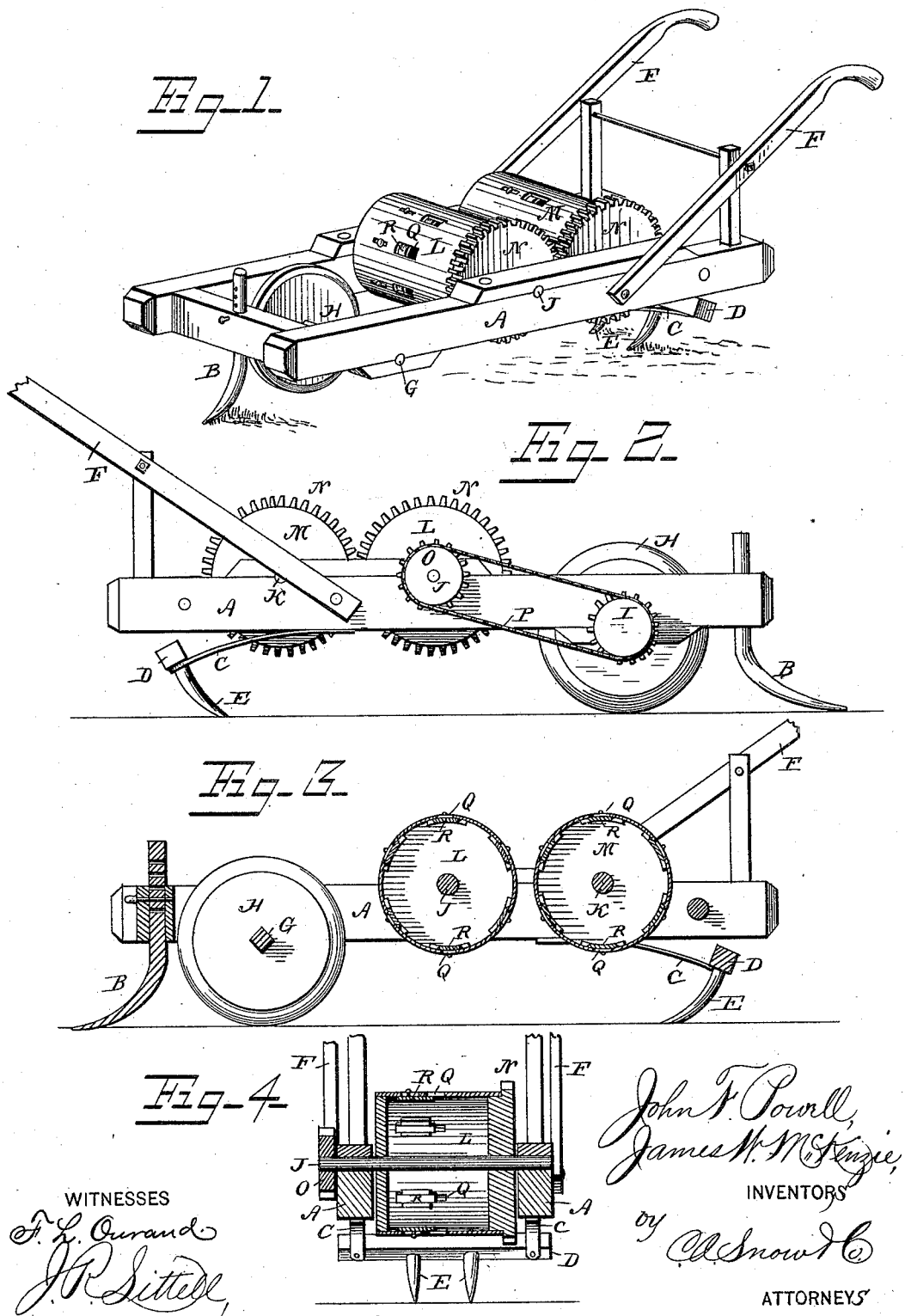

JAMES W. McKENZIE, OF DOOLY COUNTY, AND JOHN F. POWELL, OF MACON COUNTY, GEORGIA.

COMBINED SEED-PLANTER AND FERTILIZER-DISTRIBUTER.

SPECIFICATION forming part of Letters Patent No. 286,047, dated October 2, 1883.

Application filed February 24, 1883. (No model.)

*To all whom it may concern:*

Be it known that we, JAMES W. MCKENZIE and JOHN F. POWELL, citizens of the United States, residing in the counties of Dooly and Macon, and State of Georgia, have invented a new and useful Combined Seed-Planter and Fertilizer-Distributer, of which the following is a specification, reference being had to the accompanying drawings.

This invention relates to combined seed-planters and fertilizer-distributers; and it consists in certain improvements in the construction of the same, which will be hereinafter fully described, and particularly pointed out in the claim.

In the drawings hereto annexed, Figure 1 is a perspective view. Fig. 2 is a side view. Fig. 3 is a longitudinal vertical sectional view, and Fig. 4 is a vertical transverse sectional view taken through one of the revolving drums.

The same letters refer to the same parts in all the figures.

A in the drawings represents the frame of the machine, which may be rectangular, or of any suitable construction.

In the front end of the frame a furrow-opener, B, is vertically adjustable.

C C are springs attached to the under sides of the side pieces of the frame, extending rearwardly and carrying a cross-piece, D, carrying the coverers E E, which by this construction are enabled to adapt themselves to any unevenness of the ground over which the machine passes.

Handles F, of suitable construction, are provided for guiding the machine.

Near the front end of the frame are bearings for a transverse shaft, G, carrying a furrow-wheel, H. One end of the said shaft projects through the side of the frame and carries a chain-wheel, I.

J K are transverse shafts mounted in the rear part of the frame, and carrying the seeding-drums L M. One of the heads or ends of each of these drums is provided with teeth or cogs N, so that the said drums shall mesh together and revolve in opposite directions. The shaft J of the front drum, L, extends through the side of the machine-frame, and carries a chain-wheel, O, which is connected with the chain-wheel I by a chain, P.

The seeding-drums have openings Q for the escape of seed, the size of which openings may be regulated by slides R.

In operation the seed to be sowed is placed in one of the drums and the fertilizing material in the other. By the gearing described the drums are revolved in opposite directions, and the seed-openings are so disposed that seed and fertilizing material shall be dropped in the same spots.

We claim as our invention, and desire to secure by Letters Patent of the United States—

As an improvement in combined seed-planters and fertilizer-distributers, the combination of the frame, the furrow-opener vertically adjustable in the front end of the same, a transverse shaft carrying a furrow-wheel and a chain-wheel, transverse shafts carrying seeding-drums having toothed heads meshing with each other, a chain-wheel upon the front drum-shaft, a chain connecting the same with the chain-wheel upon the furrow-wheel shaft, rearwardly-extending springs secured to the under sides of the side pieces of the frame, and a cross-bar connecting the rear ends of said springs and carrying the coverers, the whole arranged and operating substantially as set forth.

In testimony that we claim the foregoing as our own we have hereto affixed our signatures in presence of two witnesses.

JAMES WILLIAM McKENZIE.
JOHN FLETCHER POWELL.

Witnesses:
W. W. DAVIS,
W. P. MAXWELL.